US008087866B2

(12) United States Patent  
Fast

(10) Patent No.: US 8,087,866 B2  
(45) Date of Patent: *Jan. 3, 2012

(54) HITCHING APPARATUS AND HAY BALE SUSPENSION SYSTEM

(75) Inventor: Lonnie B. Fast, Fairmont, WV (US)

(73) Assignee: Fast Hay Movers, Inc., Fairmont, WV (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/364,080

(22) Filed: Feb. 2, 2009

(65) Prior Publication Data

US 2009/0162168 A1  Jun. 25, 2009

Related U.S. Application Data

(63) Continuation-in-part of application No. 11/422,501, filed on Jun. 6, 2006, now Pat. No. 7,544,030.

(51) Int. Cl.  
*A01D 85/00* (2006.01)  
*B60D 1/07* (2006.01)

(52) U.S. Cl. ..... 414/24.5; 414/462; 414/911; 280/416.1

(58) Field of Classification Search ............... 414/24.5, 414/24.6, 111, 546, 555, 911, 462, 427, 428, 414/563; 280/416.1, 402, 416.2, 405; 172/439; 224/519, 520; 254/323  
See application file for complete search history.

(56) References Cited

U.S. PATENT DOCUMENTS

| 4,023,693 | A | 5/1977 | Priefert | |
|---|---|---|---|---|
| 4,126,234 | A | 11/1978 | Wells | |
| 4,215,963 | A * | 8/1980 | Doner | 414/24.5 |
| 4,237,821 | A | 12/1980 | Haines | |
| 4,348,143 | A | 9/1982 | Hedgespeth | |
| 4,527,935 | A | 7/1985 | Fortenberry | |
| 4,618,161 | A * | 10/1986 | McNeill | 280/402 |
| 4,683,970 | A | 8/1987 | Smith | |
| 5,211,601 | A | 5/1993 | Cope | |
| 5,230,526 | A | 7/1993 | Jolivet | |
| 5,513,868 | A | 5/1996 | Barr | |
| 5,540,540 | A * | 7/1996 | Peterson | 414/563 |
| 5,556,245 | A | 9/1996 | Moss | |
| 5,645,292 | A | 7/1997 | McWilliams | |
| 5,807,053 | A | 9/1998 | Pride | |
| 5,911,556 | A | 6/1999 | Caldwell | |
| 5,954,468 | A | 9/1999 | Marshall | |
| 5,964,565 | A | 10/1999 | Skotzky | |
| 6,254,117 | B1 | 7/2001 | Cross | |
| 6,286,854 | B1 | 9/2001 | Cross | |
| 6,305,894 | B1 | 10/2001 | Dearborn | |
| 6,312,210 | B1 | 11/2001 | Lang | |
| 6,378,904 | B1 | 4/2002 | Niehoff | |
| 6,435,801 | B2 * | 8/2002 | Talbott | 414/462 |

(Continued)

FOREIGN PATENT DOCUMENTS

GB  022520005  5/1992

(Continued)

*Primary Examiner* — Gregory Adams  
(74) *Attorney, Agent, or Firm* — Dinsmore & Shohl LLP; Monika J. Hussell

(57) ABSTRACT

Hay bale suspension systems for non-pivotal connection to hitches of vehicles are disclosed herein. The systems respectively comprise connector assemblies and hay bale support assemblies. The connector assemblies non-pivotally secure to a ball hitch or a receiver hitch of a vehicle. The hay bale support assemblies are non-pivotally secured to the vehicle via the connector assemblies.

10 Claims, 17 Drawing Sheets

U.S. PATENT DOCUMENTS

| | | |
|---|---|---|
| 6,461,095 B1 | 10/2002 | Puska |
| 6,607,345 B2 | 8/2003 | McElhany |
| 6,609,481 B1 | 8/2003 | McCarty |
| 6,612,380 B2 | 9/2003 | Pyle |
| 6,612,549 B1 | 9/2003 | Woods |
| 6,732,892 B1 | 5/2004 | Mangrum |
| 6,840,730 B2 | 1/2005 | Noualy |
| 6,869,265 B2 | 3/2005 | Smith et al. |
| 7,544,030 B2 * | 6/2009 | Fast .............................. 414/24.5 |
| 2001/0036395 A1 * | 11/2001 | Talbott ......................... 414/462 |
| 2001/0041116 A1 | 11/2001 | Noualy |
| 2003/0223847 A1 | 12/2003 | Crider |
| 2005/0008461 A1 | 1/2005 | Hedrich |
| 2005/0254925 A1 | 11/2005 | Braquet |
| 2009/0162168 A1 * | 6/2009 | Fast .............................. 414/24.5 |

FOREIGN PATENT DOCUMENTS

| | | |
|---|---|---|
| GB | 02364972 | 2/2002 |

* cited by examiner

HITCHING APPARATUS AND HAY BALE SUSPENSION SYSTEM

The present application is a continuation-in-part of, and claims priority to and the benefit of, U.S. patent application Ser. No. 11/422,501, filed Jun. 6, 2006.

The present invention relates to a hitching apparatus for use with vehicles, and a hay bale suspension system, for use with a vehicle to transport bales of hay.

Equipment is typically hitched to a vehicle (such as, but not limited to, an all-terrain vehicle (ATV)) by means of a standard trailer-hitch, the combination of which (the tow vehicle and trailer or equipment) form an articulated (hinged) vehicle. This type of hitch presents loss-of-control concerns when traveling over uneven terrain or transporting heavy loads, as the trailer or equipment pivots in association with the rotation of the vehicle and, depending on the load, may tip or otherwise cause the vehicle to lose control or jack-knife. Maneuvering in reverse is also difficult with the standard trailer-hitch connection between the vehicle and the equipment. Therefore, there is a need in the art to hitch equipment to a vehicle in a non-hinged manner such that the loss of control concerns are eliminated or substantially precluded. The hitching apparatus of the present invention satisfies this need. This hitching apparatus is particularly useful in coupling a hay bale suspension system to a vehicle in a non-hinged manner such that a hay bale may be suspended and transported.

The following description of the present inventions and certain embodiments thereof can be best understood when read in conjunction with the following drawings, where like structure is indicated with like reference numerals and in which.

Referring to the figures, the present invention relates to a hitching apparatus 50 for use with a vehicle 1 that facilitates the coupling of equipment to a vehicle in a non-hinged manner so as to inhibit the lateral pivot of the equipment in relation to the vehicle. The present invention further relates to a novel hay bale suspension system 10 that may be coupled to a vehicle 1 through the hitching apparatus 50 of the present invention and used to support and enable transportation of, what is preferably, a round hay bale 100.

Figure 1:
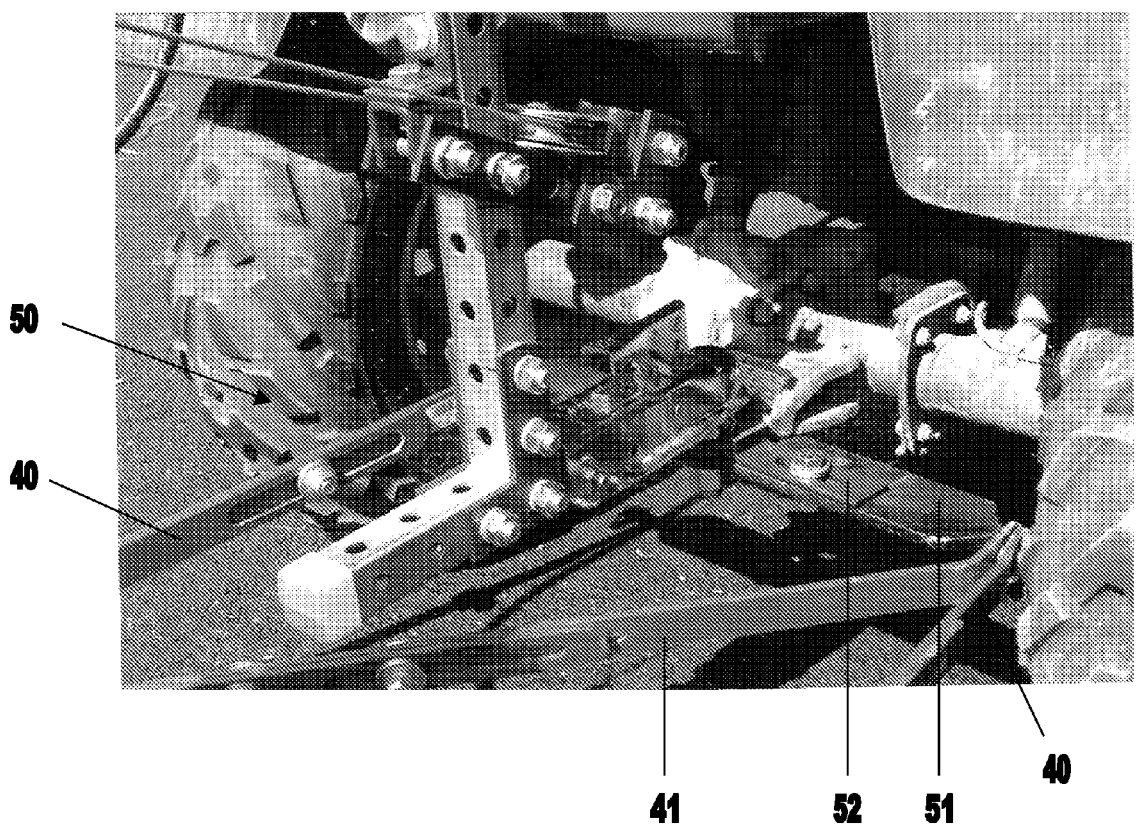
FIG. 1 shows an embodiment of a hitching apparatus of the present invention and a portion of a pulley system for a hay bale suspension system.

The hitching apparatus 50 generally comprises a hitch bar 51, means to secure the same to the rear of a vehicle 1, and means by which equipment can be coupled to the hitch bar 51, and thereby vehicle 1, in a non-hinged manner. As shown in FIG. 1, the hitch bar 51 is configured sufficiently long to stably support connecting arms 40 of the coupling means in parallel form, as hereinafter described, but short enough so that when used in conjunction with the connecting arms 40, neither the arms 40 nor the hitch bar 51 interferes with the operation of the remainder of the vehicle 1 (e.g., the wheels or suspension system).

Figure 2:
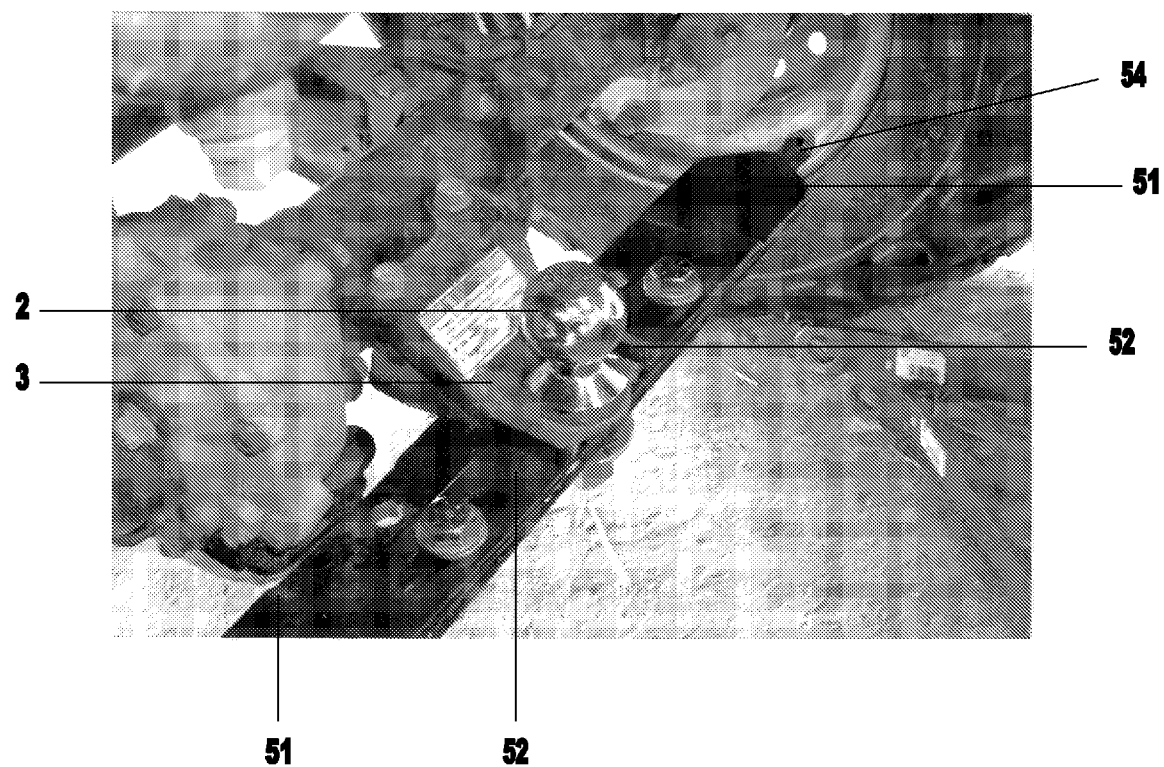
FIG. 2 shows an embodiment of a hitching apparatus of the present invention where a hitch bar is secured to a vehicle by a ball hitch and bar clamps.

As shown in FIG. 2, this hitch bar 51 may be secured to a vehicle 1 by means of one or more apertures there-through, said apertures being sized to receive the bolt of a ball hitch, preferably under the bottom plate 3 of the ball hitch. The securing means may also comprise bar clamps 52, positioned on the hitch bar 51 to butt up against the sides of the hitching extension bottom plate 3, so as to further stabilize the coupling of the hitch bar 51 to the ball hitch 2 and inhibit the lateral pivot of the hitch bar 51 about the ball hitch bolt. These bar clamps 52 may be adjustably secured to the hitch bar 51 by means of bolts and apertures or bolt slots through the bar clamps.

Figure 3:
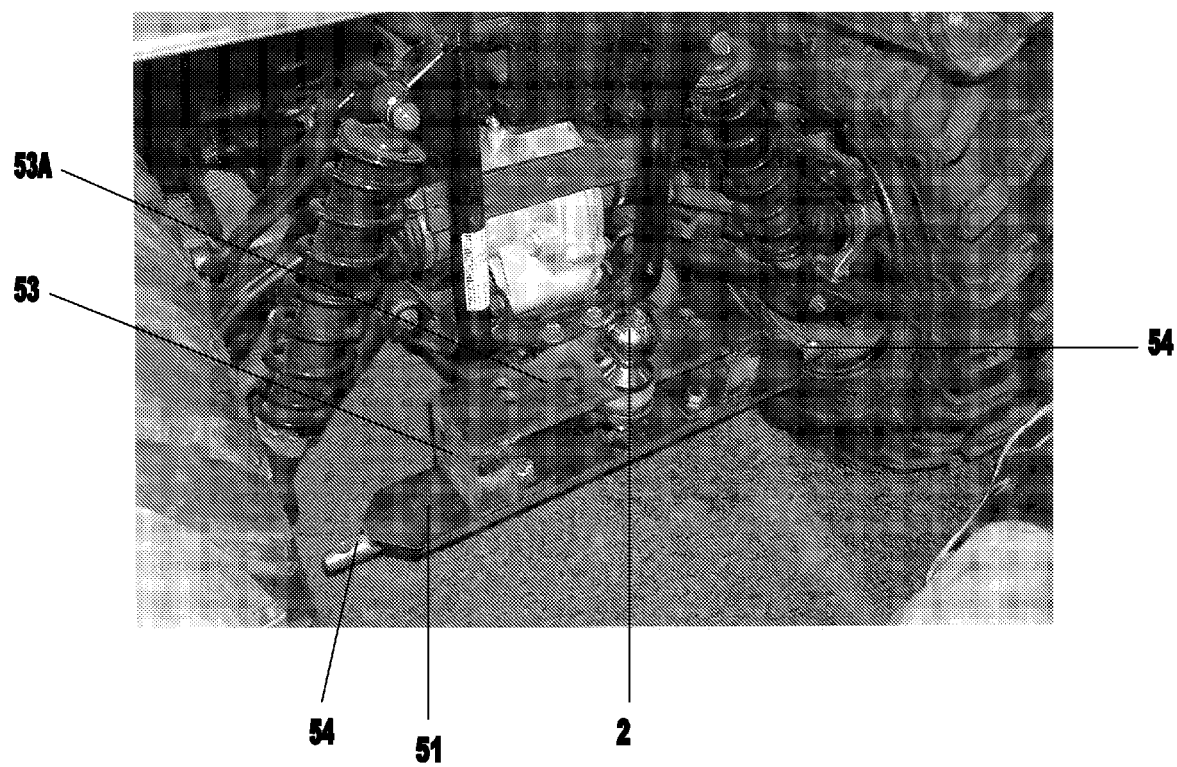
FIG. 3 shows an embodiment of a hitching apparatus of the present invention where a hitch bar is secured to a vehicle with an extension block.

As depicted in FIG. 3, the means to secure the hitch bar 51 to the vehicle 1 may further comprise an extension block 53 when the ball hitch 2 of the vehicle 1 is higher off of the ground than desired (which may cause instability in the transport of heavier matters, such as a hay bale 100 or heavy equipment). In this embodiment, the extension block 53 is affixed to the top of the hitch bar 51 by nuts and bolts securing the components together in corresponding apertures, or otherwise. When an extension block 53 is used with the hitching apparatus 50, an aperture on the top plate 53A of the block 53 receives the bolt of the ball hitch 2, and bar clamps 52 may be positioned on said top plate 53A to butt up against the sides of the hitching extension bottom plate 3. Therefore, the use of the extension block 53 lowers the position of the hitch bar 51 in relation to the vehicle 1 such that the connecting arms may maintain a substantially horizontal orientation when coupling equipment to the hitch bar 51.

Further, the hitch bar 51 may comprise at least one pin 54, shown in FIGS. 1 and 3, that is secured to and extends from each end of the hitch bar 51. This pin (or pins) 54 is configured to receive the connecting arms 40 through apertures in the terminal ends of the connecting arms 40. Exposed ends of this pin (or pins) 54 may have apertures therein to receive a clevis pin, a bolt and nut system, or other similar means to secure a connecting arm 40 to a pin 54.

Equipment, such as the hay bale suspension system 10 of the present invention, may be coupled to the hitch bar 51, and, thus, to the vehicle 1, through coupling means comprising two or more connecting arms 40. These connecting arms 40 may be straight or have some corresponding curvature and, through the terminal end apertures, may be coupled to the extending pin or pins 54 of the hitch bar 51. When coupled to the extending pin or pins 54, the connecting arms 40 are generally parallel to each other, with sufficient distance existing between them to maintain the non-hinged coupling of the equipment to the vehicle 1. Further, the connecting arms 40 preferably are coupled to the hitch bar 51 in a manner so as to maintain a substantially horizontal orientation.

Referring back to FIG. 1, the coupling means may further comprise one or more restrictive arms 41 that may be placed perpendicularly or diagonally from or near one connecting arm 40 to the other. Similar to the connecting arms 40, the restrictive arm 41 may have apertures at each terminal end to allow the affixation of the restrictive arm 41 to a pin 54 of the hitch bar 51. The restrictive arm 41, however, may be otherwise coupled to the connecting arms 40, the hitch bar 51, and the equipment, or any combination thereof, with the purpose of restricting the connecting arms 40 to a parallel formation. Thereby, the restrictive arm 41 aids in inhibiting the lateral pivot of the equipment in relation to the vehicle 1.

In some embodiments, one or more of the arms 40, 41 may comprise two or more partially overlapping bars having bolt apertures and/or slots configured to allow the lengths of such arms 40, 41 to be adjusted as may be necessary or desirable. Bushings may be used between the connecting arms 40 and the restrictive arm 41, for example on the pin 54 or rod 25, to prevent excessive wear and tear and to tighten the connectivity thereof.

Figure 4:
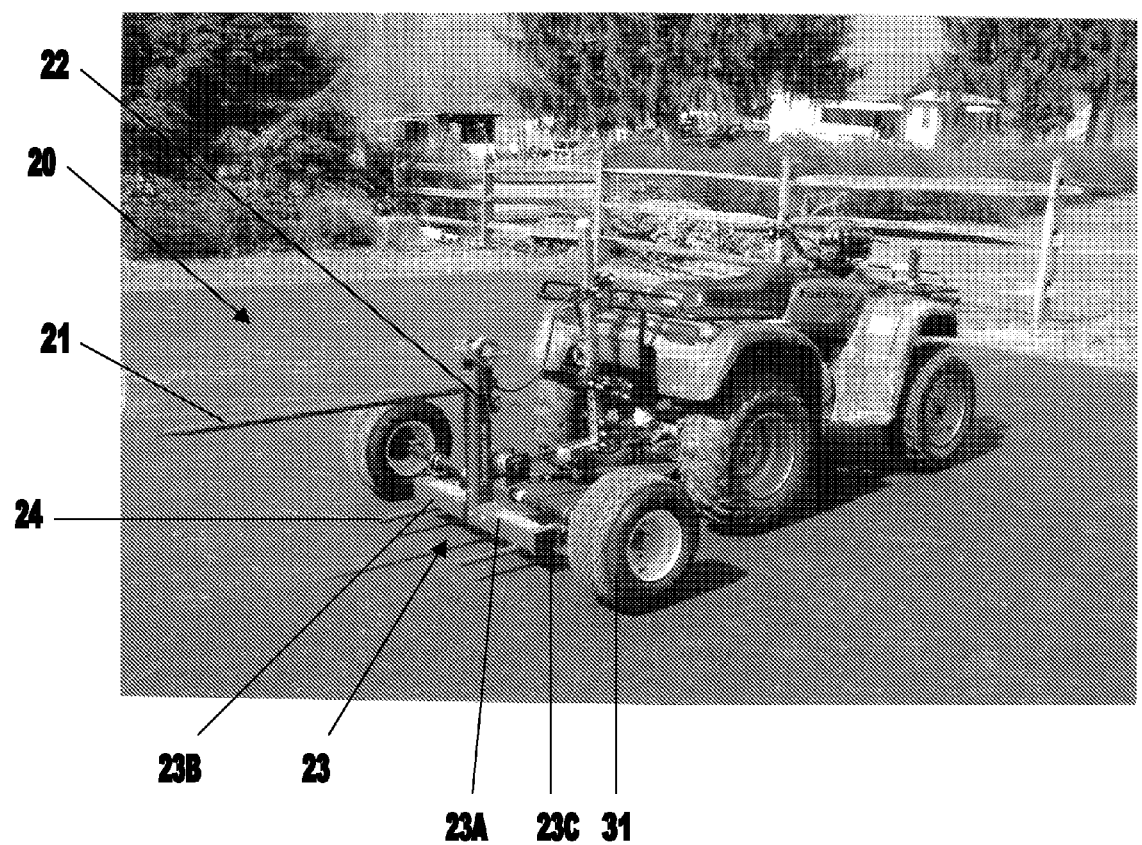
FIGS. 4 and 5 show an embodiment of a hay bale suspension system of the present invention coupled to a vehicle.
Figure 5:
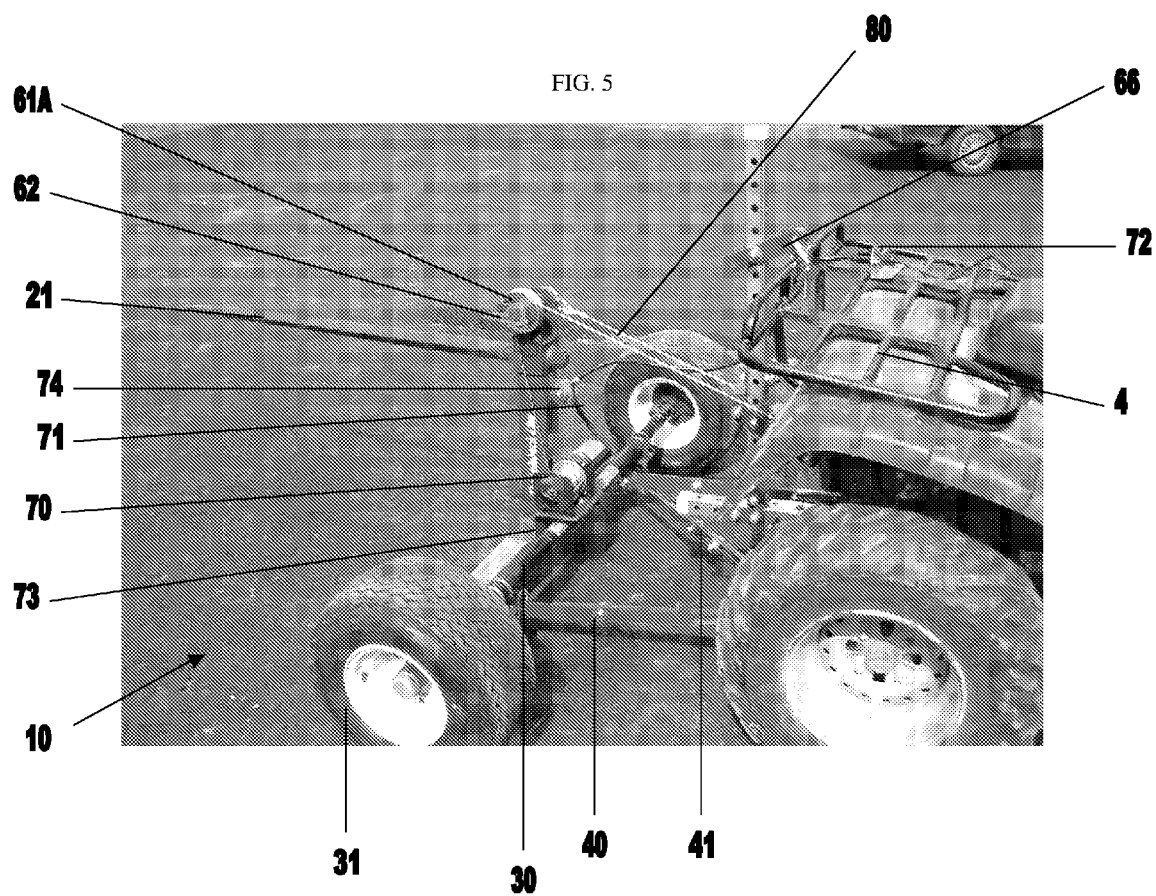
Figure 10:
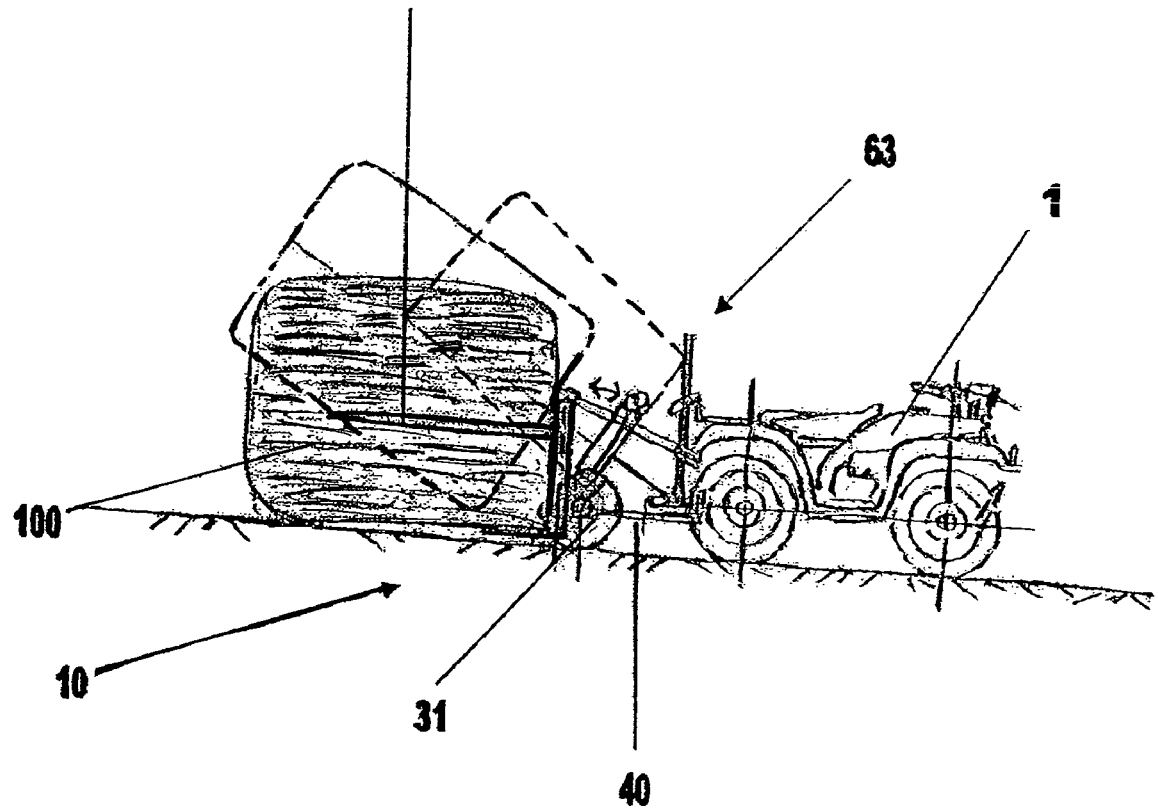
FIG. 10 is an illustration of an embodiment of a hitching apparatus and a hay bale suspension system of the present invention applied to an all-terrain vehicle.

The hay bale suspension system 10, one embodiment of which is shown in FIGS. 4, 5, and 10, that may be coupled to the hitching apparatus 50, and, thus, to a vehicle 1, preferably comprises a hay support system 20 and a pulley system 60. The hay support system 20 is configured to support a hay bale 100 during transport thereof. The pulley system 60 is configured to tilt the hay support system 20 such that the supported hay bale 100 can be suspended above a ground surface at an angle ranging from more than 1 degree to less than 90 degrees, although preferably between about 30 and 50 degrees, as shown in FIG. 10.

As shown in FIGS. 4 and 5, the hay support system 20 of the present invention generally comprises a vertical support 22, and a base support 23. The vertical support 22 is affixed to and extends upwardly from the base support 23, at or near the center thereof. In one embodiment, shown in FIGS. 4 and 5, the hay support system 20 also comprises a spike 21 that is affixed to, and extends perpendicularly from, the vertical support 22. This spike 21 is positioned such that when it is in loading position (as hereinafter described), it can be used to pierce and travel along a cylindrical axis of a hay bale 100. In another embodiment, the hay support system 20 comprises one or more, generally two, forks, rather than, or in addition to the spike 21. The forks may be configured similar to those found on a forklift and generally are affixed to, and extend perpendicularly from, the base support 23 such that the forks are parallel, or substantially parallel, with a ground surface. Thereby, the forks are generally positioned so as to slide under, or at least substantially under, a hay bale, rather than pierce a hay bale. The forks are then elevated with a tilting of the hay support system by the pulley system, which results in the forks lifting and supporting the hay bale off of a ground surface. It is contemplated that the forks may be adjustable relative to the base support and each other so as to be able to slide closer together and/or farther apart, generally dependent upon the size of the hay bale to be supported. It is also contemplated that the forks may be supported by, or integrated with, a bracket movably coupled to the vertical support 22 so that movement of the bracket up and down the vertical support by any conventional mechanically, electrically, and/or pneumatically driven mechanisms raises and lowers the forks.

Further, the base support 23 may comprise one or more support posts 24 projecting from the exterior face 23B thereof, positioned on the base support 23 to support the bottom surface of a hay bale 100. The base support 23 may further comprise base plates 24 that extend from its terminal sides 23C. Rods 25 may extend through apertures in the base plates 24 that may couple the hay support system 20 to the connecting arms 40 and, in some embodiments, the restrictive arm 41, by passing through terminal apertures of the arms 41, 42. It should be noted that the hay support system may be coupled to the connecting arms by coupling means other than the rods 25. Readily available hay support systems that are suitable for use in the present invention include (but are not limited to) a 3-point bale transport manufactured by Leinbach Machinery Company. While this embodiment has been described, other configurations of hay support systems, varying from the description above, may be used in accordance with the present invention.

Figure 6:
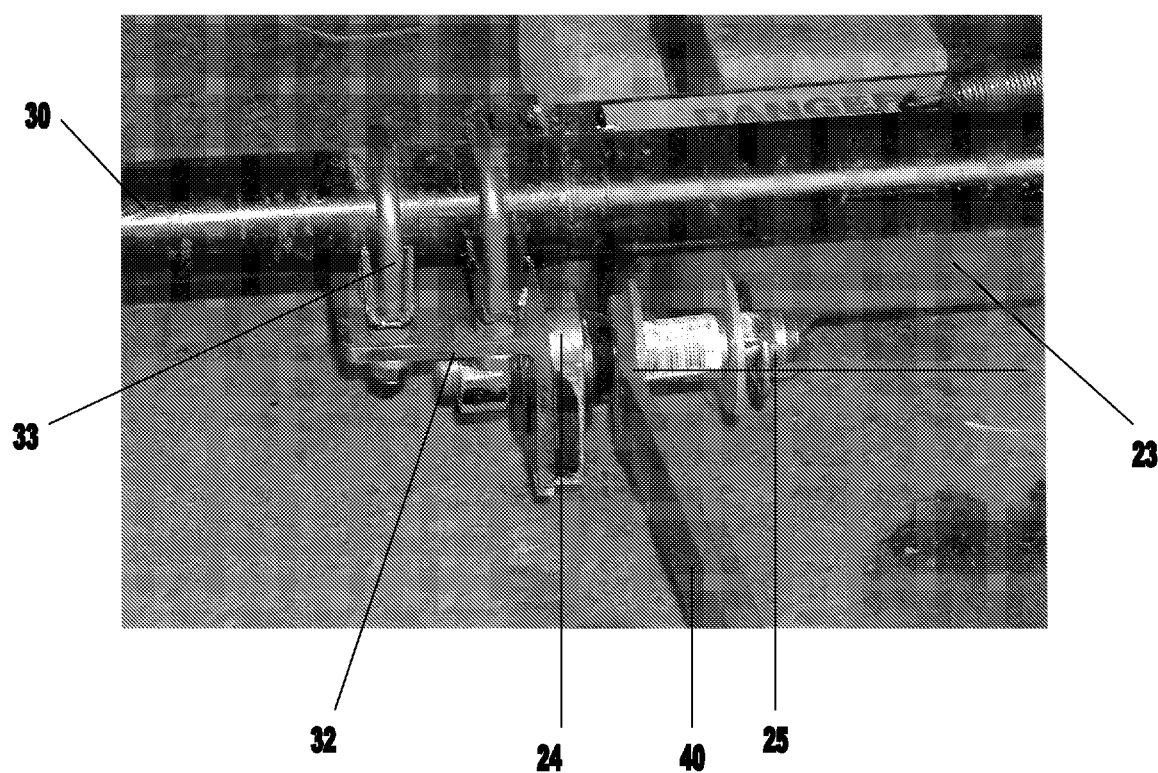
FIG. 6 shows an embodiment of the engagement of a base support of a hay support system, an axle, and the coupling means of the present invention.

As shown in FIG. 6, the hay support system 20 further comprises an axle 30 coupled to the base support 23. The axle 30 may be secured to the base support 23 by means of the base plates 24, using L-shaped brackets 32 having an aperture there-through configured to receive a rod 25 of the hay support system 20, and one or more muffler clamps 33. These muffler clamps 33 can be secured around the axle 30 and extend through additional apertures on the top face of the L-shaped brackets 32. The brackets 32 and clamps 33 may be secured to the hay support system 20 as described above by means of bolts, nuts and/or washers. While this embodiment has been described, other means to secure the axle 30 to the base support 23 may be used. The wheels 31 may then be secured to the ends of this axle 30 by means such as 4 or 5 lug hubs or other similar means. The length of axle 30 is preferably configured in size to form a more stable suspension of the hay bale suspension system 10. In addition, the hay bale suspension system 10 is configured such that the axle 30 and wheels 31 primarily bear the weight of a suspended hay bale 100. This configuration of the hay bale suspension system 10 ensures that the ball hitch 2 and a rack 4, if connected to the system 10, of a vehicle 1 are not overloaded with the weight of a suspended hay bale 100 and prevents any undue stress both on these points of connection between the system 10 and the vehicle 1 and on the vehicle 1 itself.

Generally, the pulley system 60, an embodiment of which is shown in FIG. 5, comprises two pulleys 61A, 61B, a winch 70, and a cable 80, and is configured such that a winding or unwinding of the cable 80 by the winch 70 adjusts the tilt of the hay support system 20. One of these pulleys 61A may be mounted to a top end of the vertical support 22 of the hay support system 20. This pulley 61A may be provided with a pulley protection assembly 62 that is configured to protect the rotation of the pulley 61A and the winding or unwinding of the cable 80 about this pulley 61A from interference from a supported hay bale 100 tilted by the hay support system 20. Meanwhile, the second pulley 61B provides additional support to the hay support system 20 by applying a lateral opposition pull against the vehicle 1, with little dependence on the countervailing weight of the vehicle 1. Thus, the strength of the pulley system 60 is applied to the weight of the hay bale 100 as the pulley system 60 tilts the supported hay bale 100 off of the ground surface. The configuration and placement of the second pulley 61B, however, may depend on the suspension system of the vehicle 1.

Figure 7:
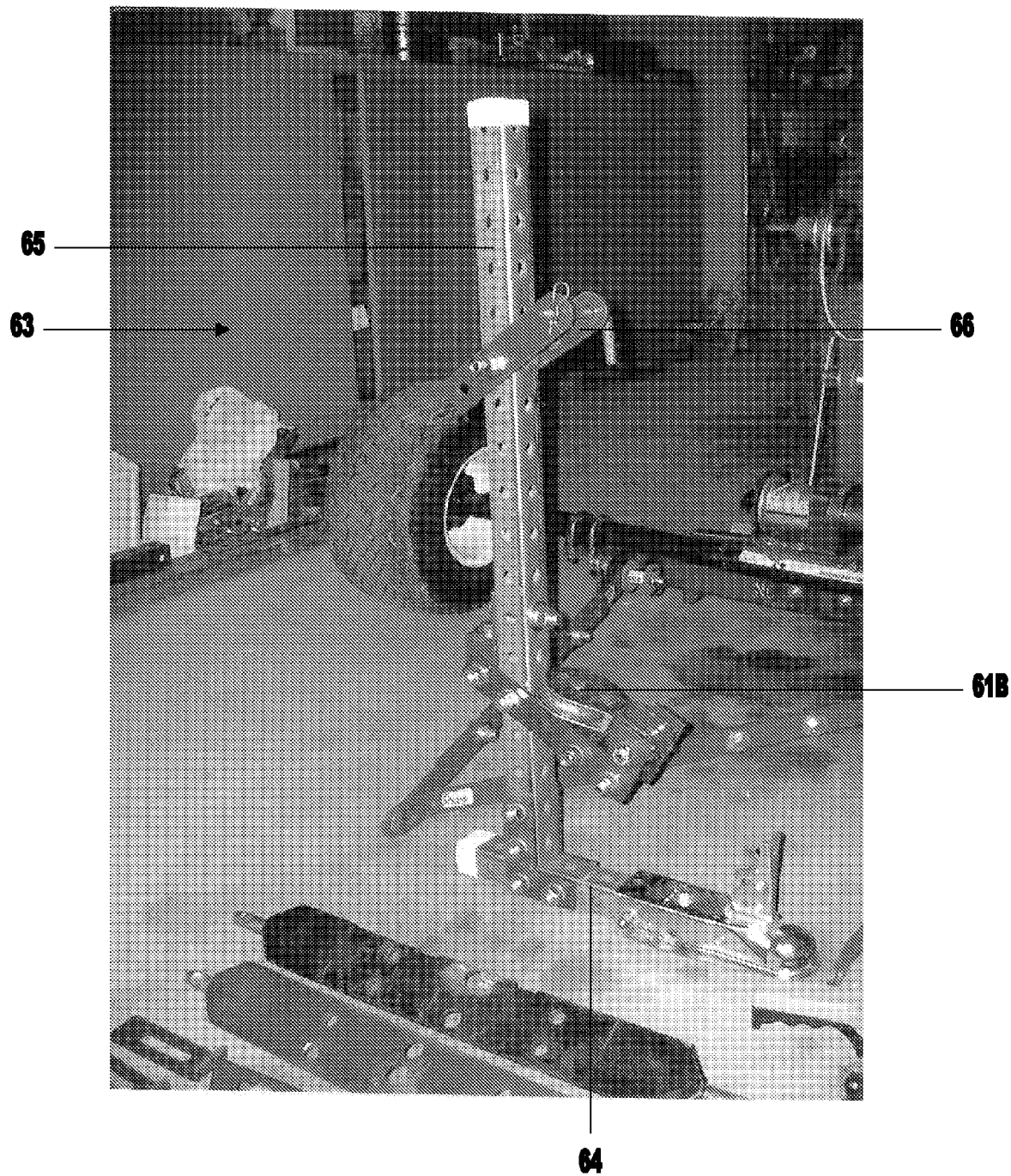
FIG. 7 shows an embodiment of the vertical post system of the present invention.

For a vehicle having a straight axle suspension system, the pulley system 60 further comprises a vertical post system 63, an embodiment of which shown in FIG. 7. This vertical post system 63 may comprise a vertical post 65 and means to secure said post 65 to the system 63. The second pulley 61B may be affixed to this vertical post 65 through the use of brackets, nuts, and bolts, or other similar components. As shown in FIG. 7, the vertical post system 63 may be configured to secure to the ball hitch 2 of the vehicle 1 and to a rack 4 or to the top rear surface of the vehicle 1. Securing the vertical post system 63 to two areas of the vehicle 1 provides greater stability to the hay bale suspension system 10 that may be desirable when the system 10 is applied to straight axle suspension vehicles.

Figure 8:
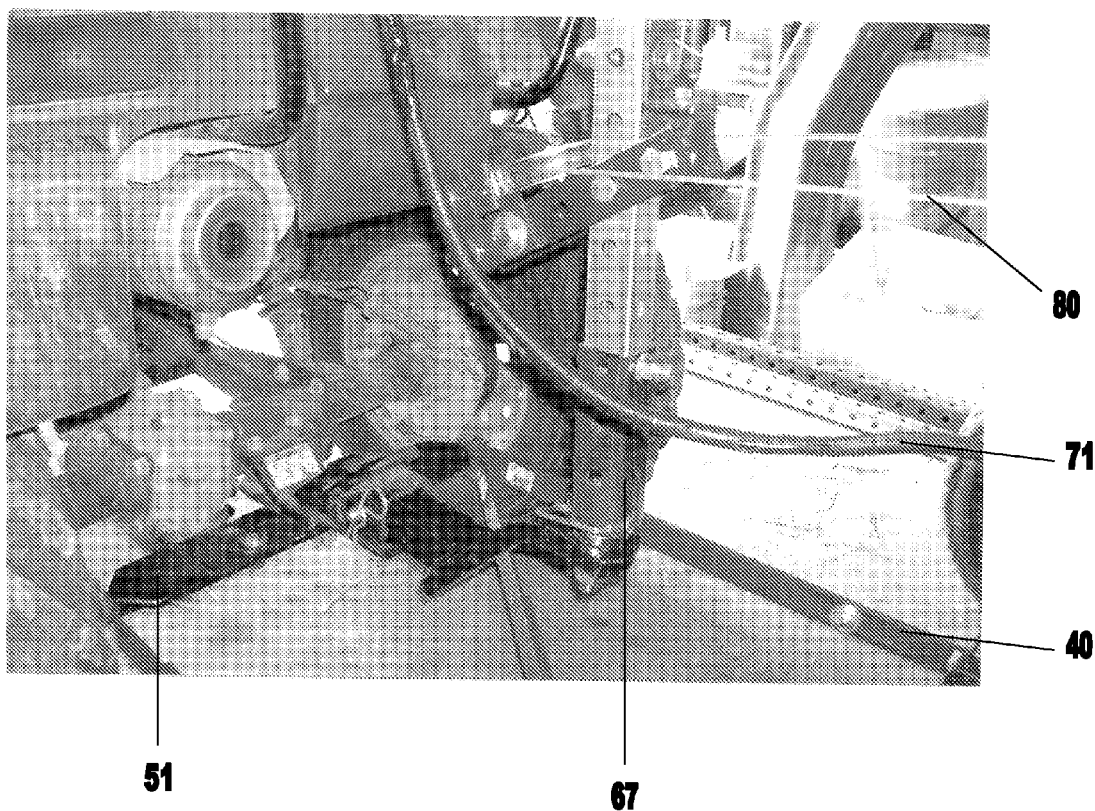
FIG. 8 shows another embodiment of the vertical post system of the present invention having a ball hitch coupler.

Specific embodiments of the vertical post system 63 may vary depending on the structure of the vehicle 1. For example, a horizontal beam 64 may be used to remove the vertical post 65 of the system 63 a distance from the ball hitch 2 such that the post 65 may rise higher than the rear of the vehicle 1 and secure to the vehicle rack 4. Apertures along a length of this horizontal beam 64 allows for adjustments in the placement of the vertical post 65 in relation thereto. Alternatively, when the horizontal beam is not necessary, the vertical post 65 may be coupled to the ball hitch 2 by means of a ball hitch extension and a ball hitch coupler 67, as shown in FIG. 8. This ball hitch coupler 67 may be configured to secure, with the aid of locking pins or other similar devices, over top of a ball hitch 2 and to the vertical post 65, thereby conjoining the two.

The vertical post system 63 may be affixed to the rack 4 of the vehicle 1 by means of one or more rack brackets 66. These rack brackets 66 are configured to secure the vertical post 65 to the vehicle rack 4 while allowing suspension movement of the vehicle 1 found in single axle vehicles. More specifically, these rack brackets 66 may be secured to the vertical post 65 in a manner that enables the brackets 66 to pivot along a vertical axis as the rack 4 rises or falls with changes in the stress placed on a vehicle's single axle suspension. The rack brackets 66 may comprise brackets, pins, nuts, and bolts, or other devices, and any combination thereof. To allow adjustment of the placement of the pulley 61B and rack bracket 66 along the vertical post 65, as may be required to accommodate different vehicle designs, the vertical post 65 may have multiple apertures along the length thereof to receive at varying heights securing means (such as bolts and nuts) for the bracket 66 and pulley 61B.

Figure 9:
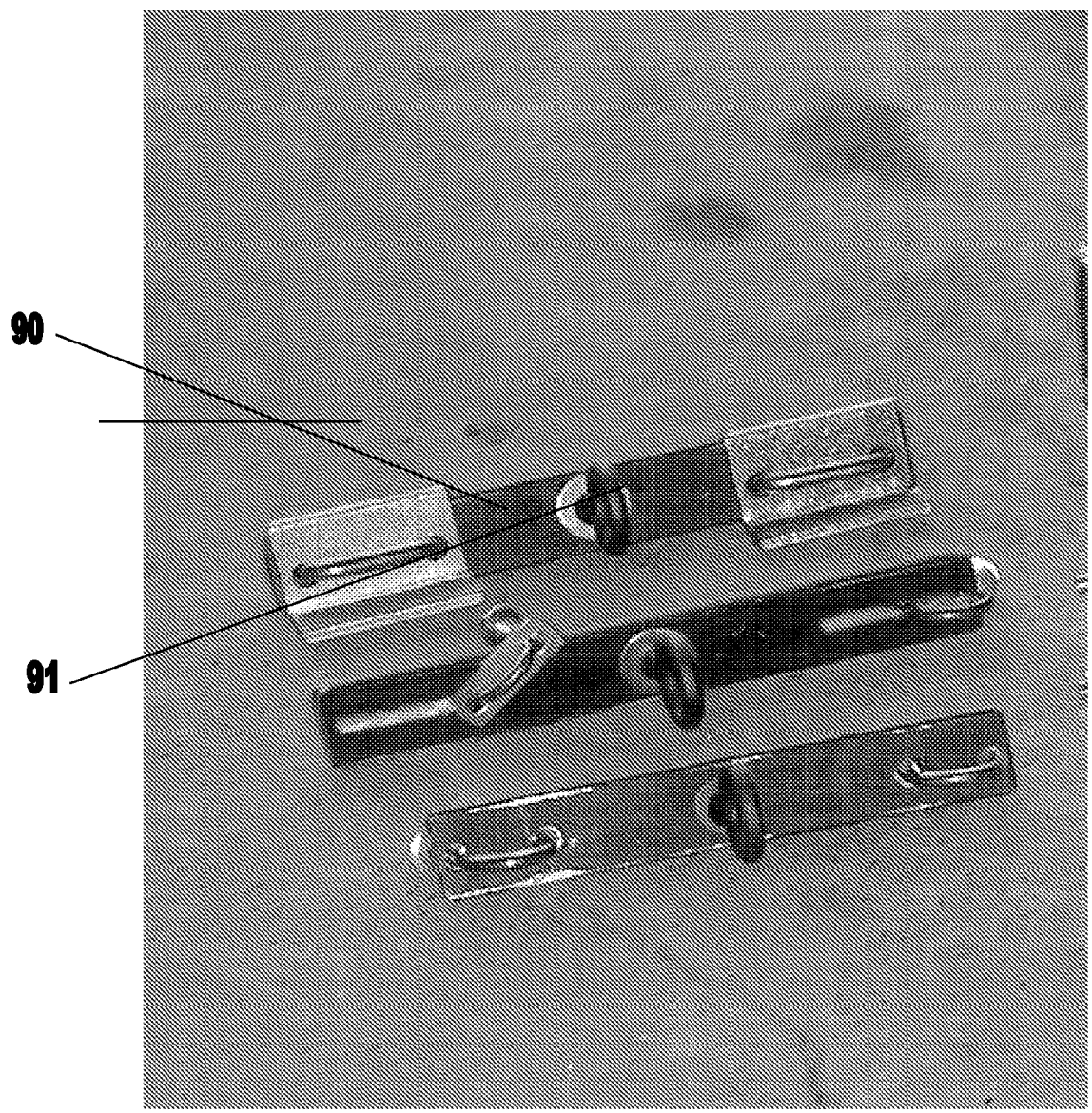
FIG. 9 shows an embodiment of a plate and eye bolt assembly of the present invention.

Alternatively, for a vehicle having an independent suspension system, the pulley system 60 comprises a plate 90, rather then vertical post system 63 described above. This plate 90, shown in FIG. 9, comprises a plurality of apertures and is secured to the rear frame of the vehicle 1 through at least one of these apertures with any of the aforementioned securing means, preferably in a position above the hitching extension 3 but below the top rear of the vehicle 1. This position of the plate 90 provides greater stabilization to the hay bale suspension system 10 when tilting and transporting a hay bale 100. An eye bolt 91 or other similar device may be secured to the plate 90 to receive a snap hook or other securing device coupled to the second pulley 61B such that the second pulley 61B is bound to the plate 90.

The winch 70 of the pulley system 60, an embodiment of which is shown in FIG. 5, may be secured to the hay support system 20 by means of an L-shaped plate 73. The out-facing surface of the plate 73 is secured to both the base support 23 and the vertical support 22 of the hay support system 20 such that a top of this out-facing surface may support and be secured to the winch 70.

While a manually operated winch may be used, your inventors prefer to use a powered winch 70 having a torque of at least 2,000 pounds. The winch can easily be powered by the battery of the vehicle 1. Preferably, the electrical connection 71 of the winch 70 is positioned such that the connection 71 is not damaged, pinched, or otherwise compromised by the operation of the hay bale suspension system 10. This positioning of the electrical connection 71, which may be bound by a flexible plastic shaft to provide further protection, may be provided by a wire support 74 that is secured to the vertical support 22 of the hay support system 20. The wire support 74 comprises an aperture through which the electrical connection 71 may pass before traveling to the battery. This electrical connection 71 may be interrupted by a power switch 72 that controls the electrical output from the battery to the winch 70. By way of example only, the winch 70 may be connected by a Quick-Connect power supply and, having its core rotation controlled by an in/out remote controller.

The cable 80 of the pulley system 60 generally is configured such that one end of the cable 80 is secured to and partially wound around the winch 70, while a second end of the cable 80, after passing about the pulleys 61A and 61B of the pulley system 60, is secured to the vertical support 22 of the hay support system 20 via a snap hook or other securing device. The winch 70 may then be used to wind additional cable around its core, thereby causing the hay support system 20 to tilt along a vertical axis of rotation established by the axle 30 of the system 20. Similarly, the winch 70 may be used to unwind the cable 80, causing the hay support system 20 to tilt along this vertical axis back toward the ground surface.

Figure 11:
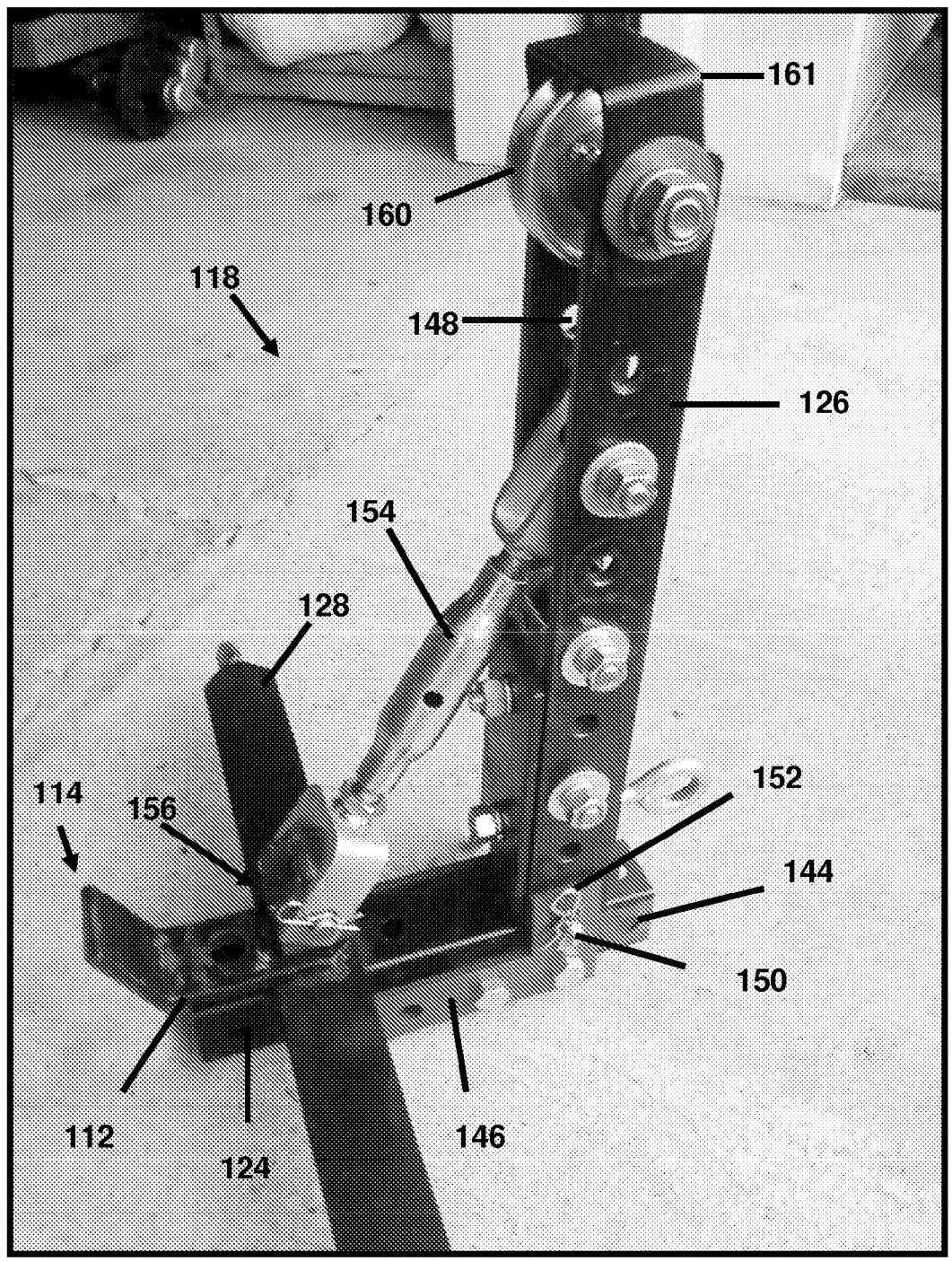
FIG. 11 shows a connector assembly of a hay bale suspension system for non-pivotal connection to a ball hitch of a vehicle according to another embodiment of the present invention.
Figure 12:
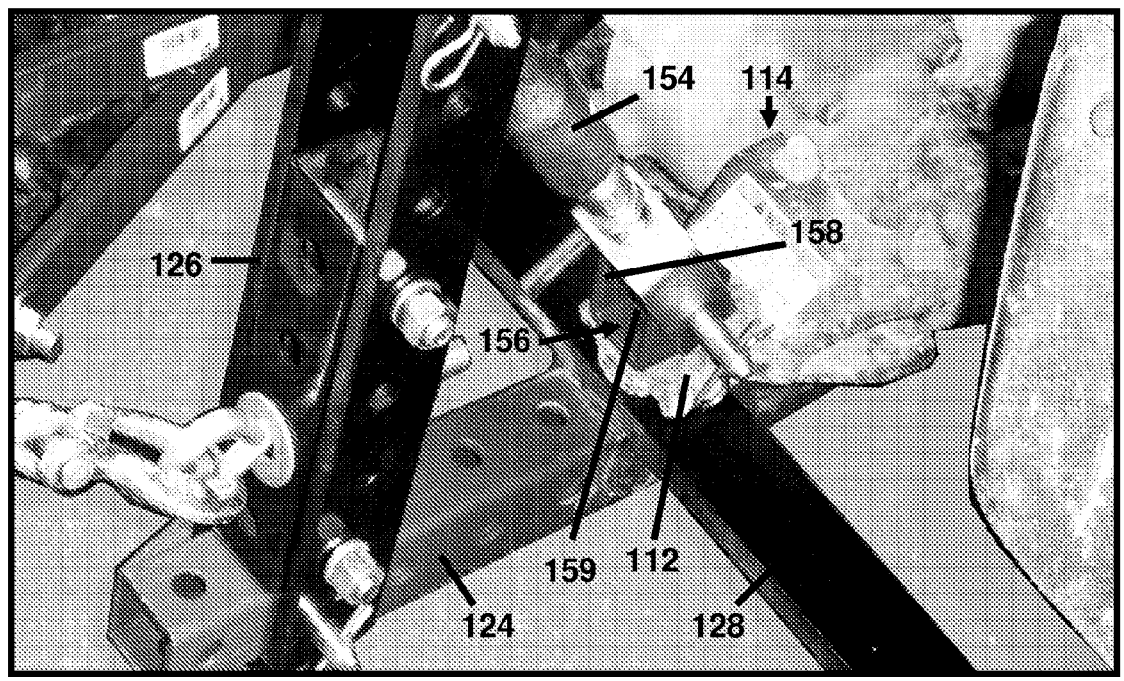
FIG. 12 shows a connector assembly of a hay bale suspension system non-pivotally secured to a bottom plate of a ball hitch of a vehicle according to another embodiment of the present invention.
Figure 13:
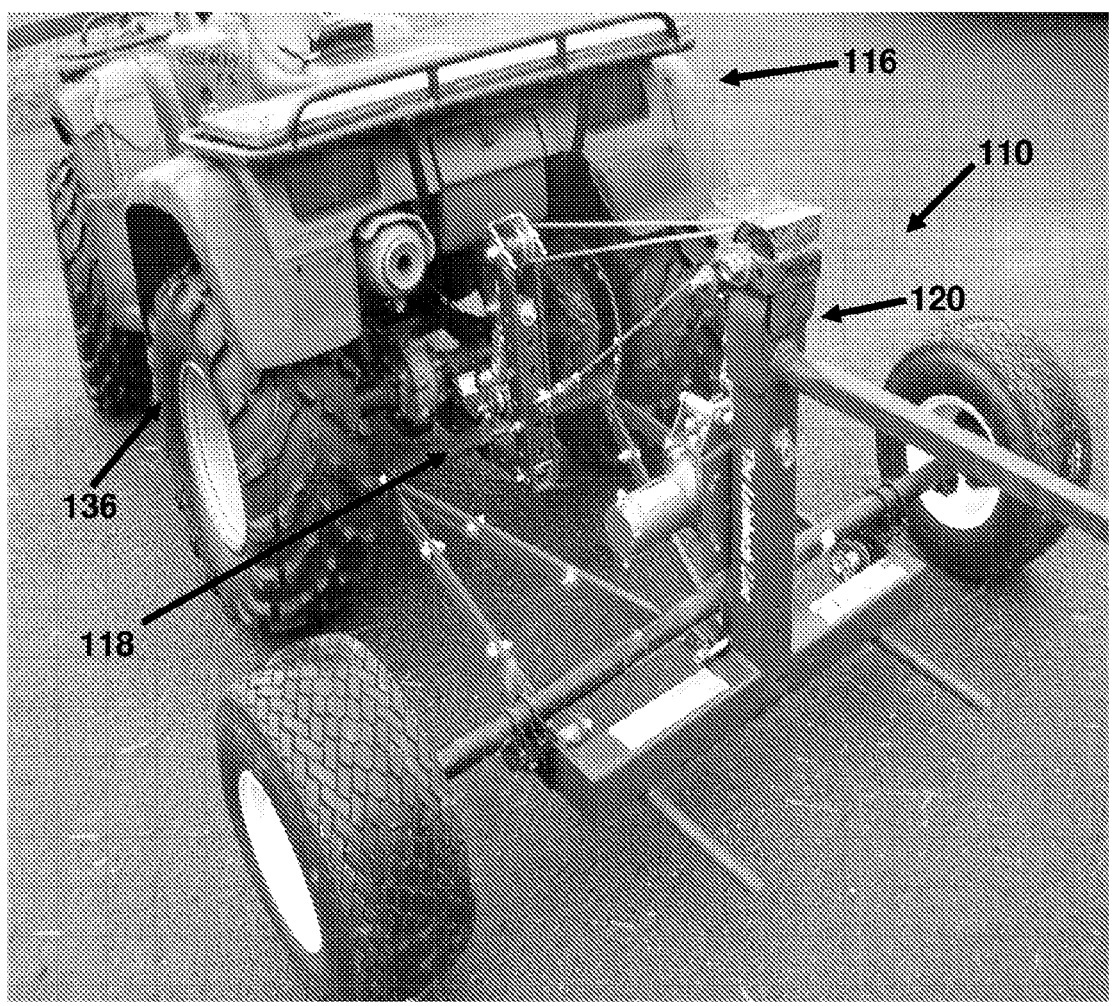
FIG. 13 shows a hay bale suspension system non-pivotally connected to a ball hitch of a vehicle according to another embodiment of the present invention.

Another embodiment of a hay bale suspension system 110 is illustrated in FIGS. 11-13. This hay bale suspension system 110 is operable for non-pivotal connection to a bottom plate 112 of a ball hitch 114 of a vehicle 116, from which a ball of the ball hitch 114 may be removed to make accessible an aperture in the bottom plate 112. The hay bale suspension system 110 comprises a connector assembly 118 that non-pivotally secures to the aperture in the bottom plate 112 and a hay bale support assembly 120 that supports a hay bale and is non-pivotally secured to the vehicle 116 via the connector assembly 118.

Figure 14:
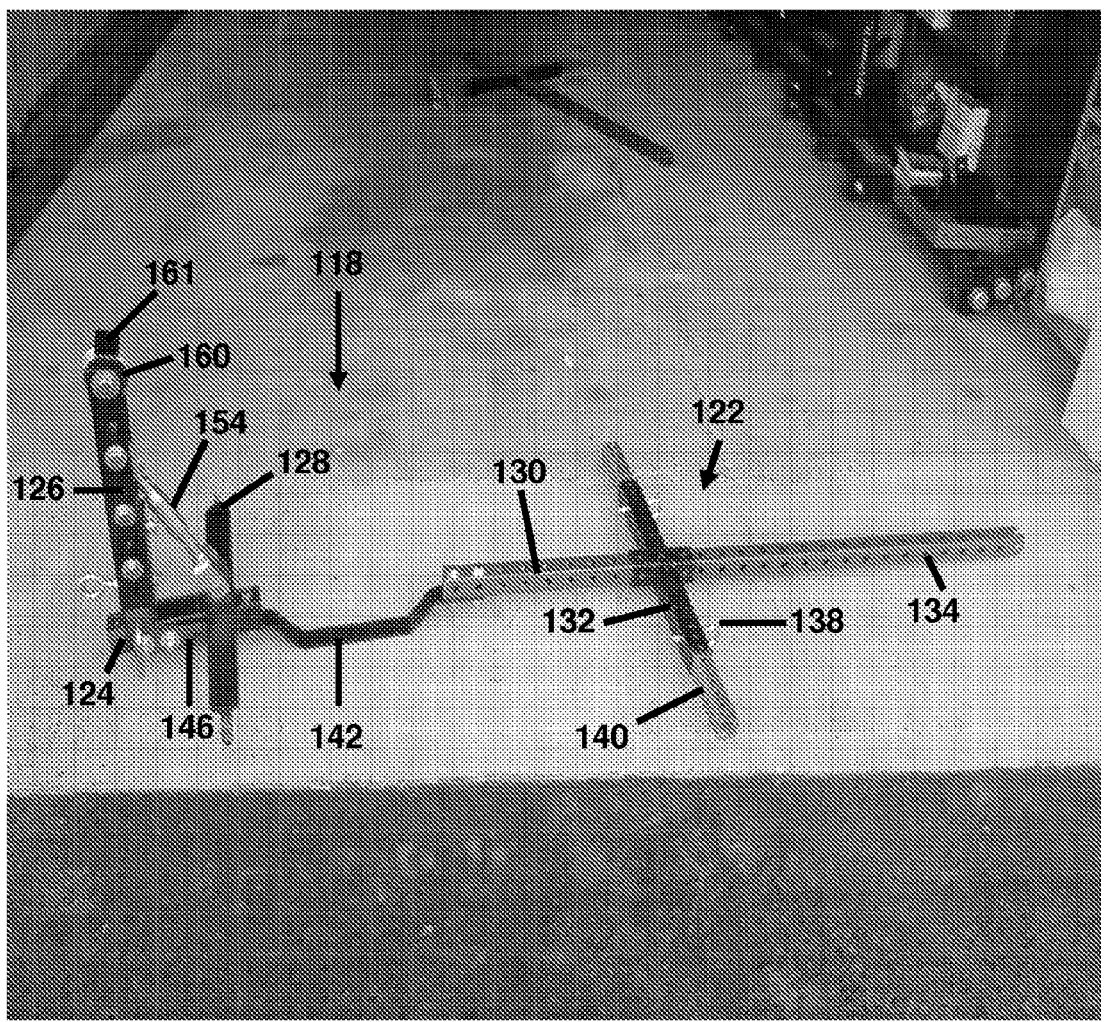
FIG. 14 shows a connector assembly of a hay bale suspension system for non-pivotal connection to a ball hitch of a vehicle according to another embodiment of the present invention.

The connector assembly 118 comprises a support shaft 122, a connector shaft 124, a vertical post 126, and a hitch bar 128. The support shaft 122, shown in FIGS. 12-14, non-pivotally secures to the vehicle 116 and comprises a longitudinally extending shaft 130 and an intersecting shaft 132. The longitudinally extending shaft 130 includes a plurality of apertures 134 and is non-pivotally secured at one end to the connector shaft 124, while the intersecting shaft 132 is perpendicularly secured to the longitudinally extending shaft 130 and is variably positionable by securing to any one or more of the apertures 134 of the longitudinally extending shaft 130. The intersecting shaft 132 non-pivotally secures to an underside 136 of the vehicle 116 to non-pivotally secure the support shaft 122 to the vehicle 116. As shown in FIG. 14, eye bolts 138, for example, may be used to secure the intersecting shaft 132 to the underside 136 of the vehicle. Locking pins, or other fasteners, may be used to secure the eye bolts 138 to the frame, or other area, of the vehicle. In addition, the intersecting shaft 132 may comprise one or more end extensions 140 to facilitate and/or enhance the securing of the support shaft 122 to the underside 136 of the vehicle 116. The support shaft 122 also may comprise an extension strap 142, shown in FIG. 14, that is non-pivotally secured at one end to the longitudinally extending shaft 130 and at another end to the connector shaft 124. The extension strap 142 generally is contoured to bypass a portion of the underside 136 of the vehicle 116. As such, use of the extension strap 142 may facilitate the securing of the support shaft 122 to the underside 136 of the vehicle 116 when a portion of the vehicle 116 suspends lower than a remainder of the underside 136 of the vehicle 116. The intersecting shaft 132 may be secured to a belly plate, the frame, running board, and/or fenders, or other part of the vehicle 116, accessible from the underside 136 of the vehicle 116.

The support shaft 122 generally is secured to the underside 136 of the vehicle 116 such that one end of the longitudinally extending shaft 130 extends beyond the ball hitch 114 provided at the rear of the vehicle 116. As such, the connector shaft 124 may slide onto or into the longitudinally extending shaft 130 and secure non-pivotally thereto. Thereby, it is contemplated that one of the connector shaft 124 and the support shaft 122 may insert into the other of the connector shaft 124 and the support shaft 122 such that the connector shaft does not pivot relative to the support shaft 122 when secured thereto. Fasteners, such as, but not limited to, nuts/bolts and locking pins, may be used to secure the connector shaft 124 to the support shaft 122. For example, the connector shaft 124 may have a plurality of apertures 144 that extend along a length thereof. These apertures 144 may align with one or more apertures 134 in the longitudinally extending shaft 130 of the support shaft 122. Fasteners may pass through the aligned apertures 134, 144 to secure the non-pivotal connection between the two shafts 124, 130.

The connector shaft 124 also is connected to the hitch bar 128. More particularly, the hitch bar 128 is perpendicularly and non-pivotally secured to the connector shaft 124. It is contemplated that the hitch bar 128 may be welded to the connector shaft 124 or otherwise non-pivotally secured via any combination of clasps, clamps, brackets, nuts, and bolts, or other fasteners. An aperture in the hitch bar 128 generally aligns with an aperture 144 in the connector shaft 124 and an aperture 134 in the longitudinally extending shaft 130. The positioning of the connector shaft 124 onto or into the longitudinally extending shaft 130 positions the hitch bar 128 for securing to the bottom plate 112 of the ball hitch 114. For example, as shown in FIGS. 11-14, a top surface of the hitch bar 128 abuts a bottom surface of the bottom plate 112 of the ball hitch 114 such that the respective apertures of the bottom plate 112, the hitch bar 128, the connector shaft 124, and the longitudinally extending shaft 130 align. Thereby, a bolt or other fastener may pass therethrough to interconnect and secure the these aligned components.

The vertical post 126 also is secured to the connector shaft 124. More particularly, as shown in FIG. 11, a bracket 146, generally configured as an L-shaped bracket, secures the vertical post 126 to the connector shaft 124 in either a rigid connection or a pivotable connection. It is contemplated that the ability of the vertical post 126 to pivot relative to and along an axis parallel with the connector shaft 124 may reduce the stress and/or strain on the connection between the connector assembly 118 and the bottom plate 112 of the ball hitch 114 that may be applied with the loading and unloading of a hay bale.

With respect to the rigid connection, nuts/bolts, or other suitable, tighten-able fasteners, may be used to non-pivotally secure the vertical post 126 to the connector shaft 124. When a rigid connection is desired, the connector assembly 118 may be connected to the bottom plate 112 with the ball, and bolt thereof, of the ball hitch 114 or with any other bolt and nut. Further, the vertical post 126 may comprise a plurality of apertures 148 along a length thereof and be lowered relative to the connector shaft 124 by securing to the connector shaft 124 at any one or more of the apertures 148 in an upper end of the vertical post 126. It is contemplated that the lowering of the vertical post 126 relative to the connector shaft 124 may reduce the stress and/or strain on the connection between the connector assembly 118 and the bottom plate 112 of the ball hitch 114 applied with the loading and unloading of a hay bale.

With respect to a pivotable connection, a locking pin 150 may pass through aligned apertures in the vertical post 126, the L-shaped bracket 146, and the connector shaft 124. A cotter pin 152, or other quick release pin, may be used to prevent the locking pin 150 from withdrawing from the aligned apertures without prior removal of the cotter pin 152. Thereby, the vertical post 126 is pivotable relative to and along an axis parallel with the connector shaft 124. When a pivotable connection is desired, the connector assembly 118 may further comprise a leveling arm 154 to guide the pivoting of the vertical post 126. The leveling arm 154 also provides positional adjustability to the connector assembly 118 so that it may be applied to a variety of differently configured vehicles and hitches.

The leveling arm 154 may be pivotally secured at one end to the vertical post 126 and may pivotally secure at another end to the bottom plate 112 of the ball hitch 114. More particularly, the leveling arm 154 may be secured to the aperture in the bottom plate 112 by the bolt of the ball of the ball hitch 114 or by a fastener assembly 156 of the connector assembly 118. The fastener assembly 156 may comprise a U-shaped bracket 158 with a centrally disposed aperture and a bolt 159 for passage through the aperture. Generally, the bolt 159 may extend through the respective apertures in the U-shaped bracket 158, the bottom plate 112 of the ball hitch 114, the hitch bar 128, the connector shaft 124, and the longitudinally extending shaft 130. Thereby, the leveling arm 154 is pivotally secured to a top surface of the bottom plate 112 and the hitch bar 128 is non-pivotally secured to a bottom surface of the bottom plate 112.

The hay bale support assembly 120 comprises a hay support system, a pulley system, and two connecting arms. The hay support system generally comprises a base support, a vertical support, a spike, an axle, and two wheels. One of the pulleys 160 of the pulley system is secured to an upper end of the vertical post of the connector assembly, while another of the pulleys is secured to the vertical support of the hay support system. It is contemplated that one or more of the pulleys may be protected by a pulley protection assembly 161. Further, the connecting arms connect the hay support system and the pins of the hitch bar such that the hay support system is non-pivotally secured to the vehicle via the connector assembly.

It is understood that, at times, a user of the hay bale suspension system may wish to operate the vehicle without the hay support system secured thereto. Therefore, it is contemplated that various components of the hay bale suspension system may be interconnected with quickly releasable fasteners. For example, in one embodiment, the vertical post is connected to the bracket and the connector shaft, the leveling arm is connected to the U-shaped bracket of the fastener assembly, and the connecting arms are connected to the pins of the hitch bar with locking pins and cotter pins. Thereby, with removal of the cotter pins and locking pins, the leveling arm may be freed from its connection with the fastener assembly, which may remain secured to the bottom plate of the ball hitch along with the hitch bar, the connector shaft, and the support shaft; the vertical post may be freed from its connection with the bracket and the connector shaft; and the connecting arms may be freed from their connection with the hitch bar. As such, the vertical post and leveling arm of the connector assembly along with the hay bale support assembly (i.e., the hay support system, the pulley system, and the connecting arms) may be disconnected and removed from the vehicle, while the connector shaft, hitch bar, and support shaft of the connector assembly remain secured thereto.

Figure 15:
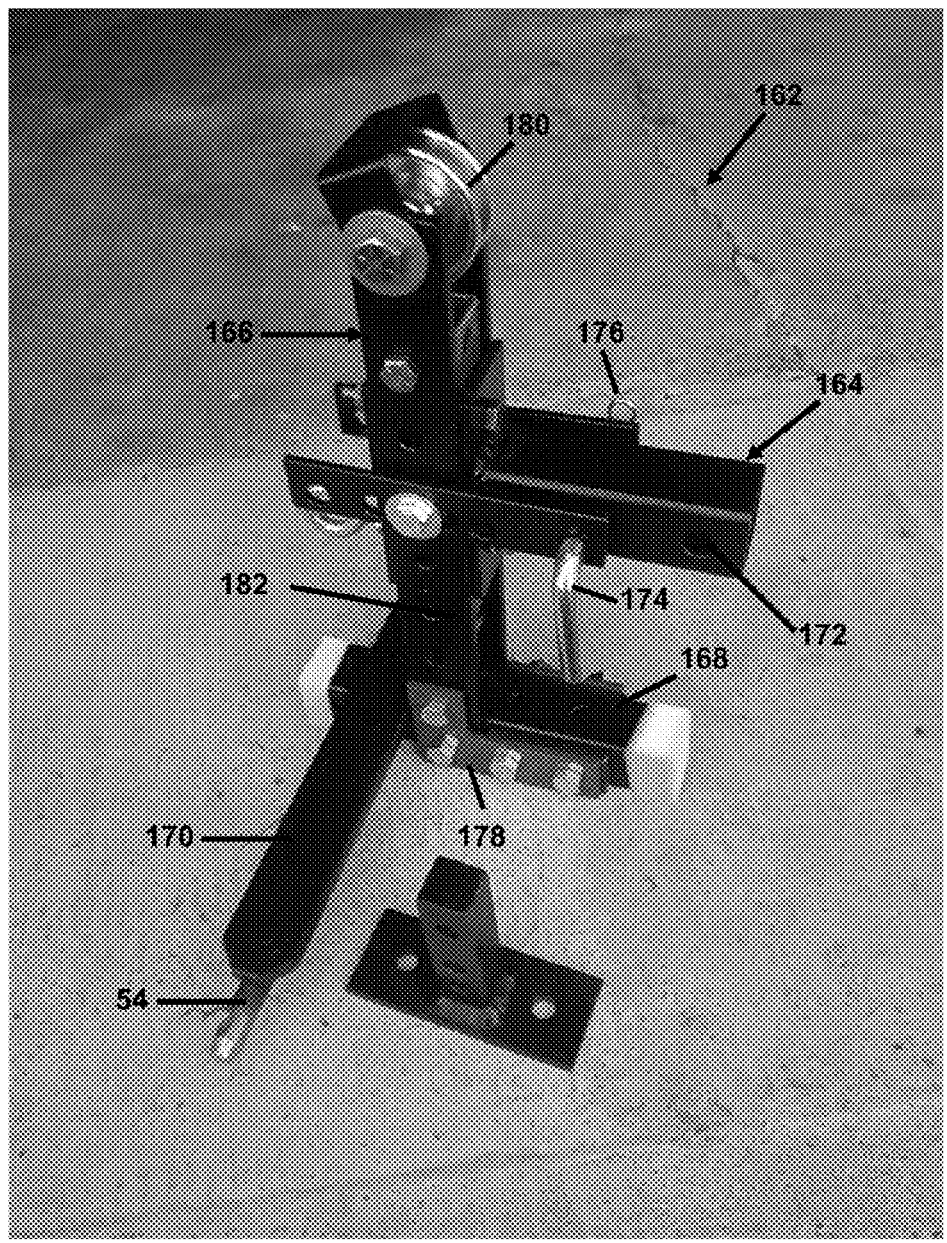
FIG. 15 shows a connector assembly of a hay bale suspension system for non-pivotal connection to a receiver hitch of a vehicle according to another embodiment of the present invention.
Figure 16:
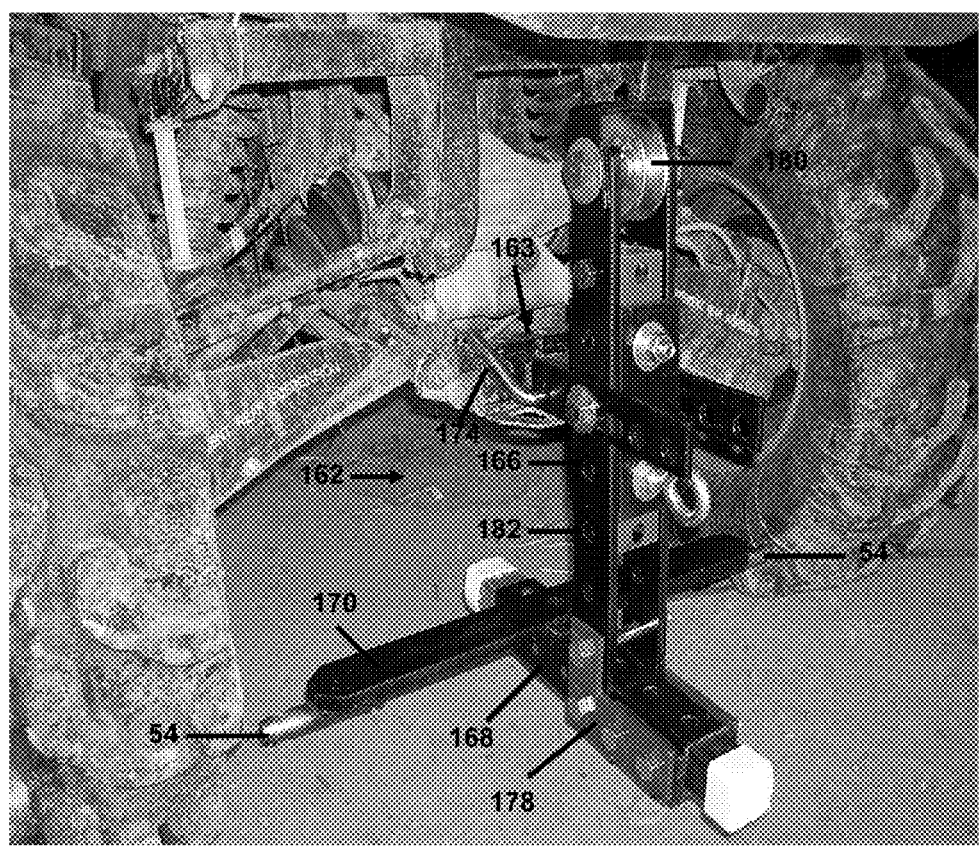
FIG. 16 shows a connector assembly of a hay bale suspension system non-pivotally connected to a receiver hitch of a vehicle according to another embodiment of the present invention.
Figure 17:
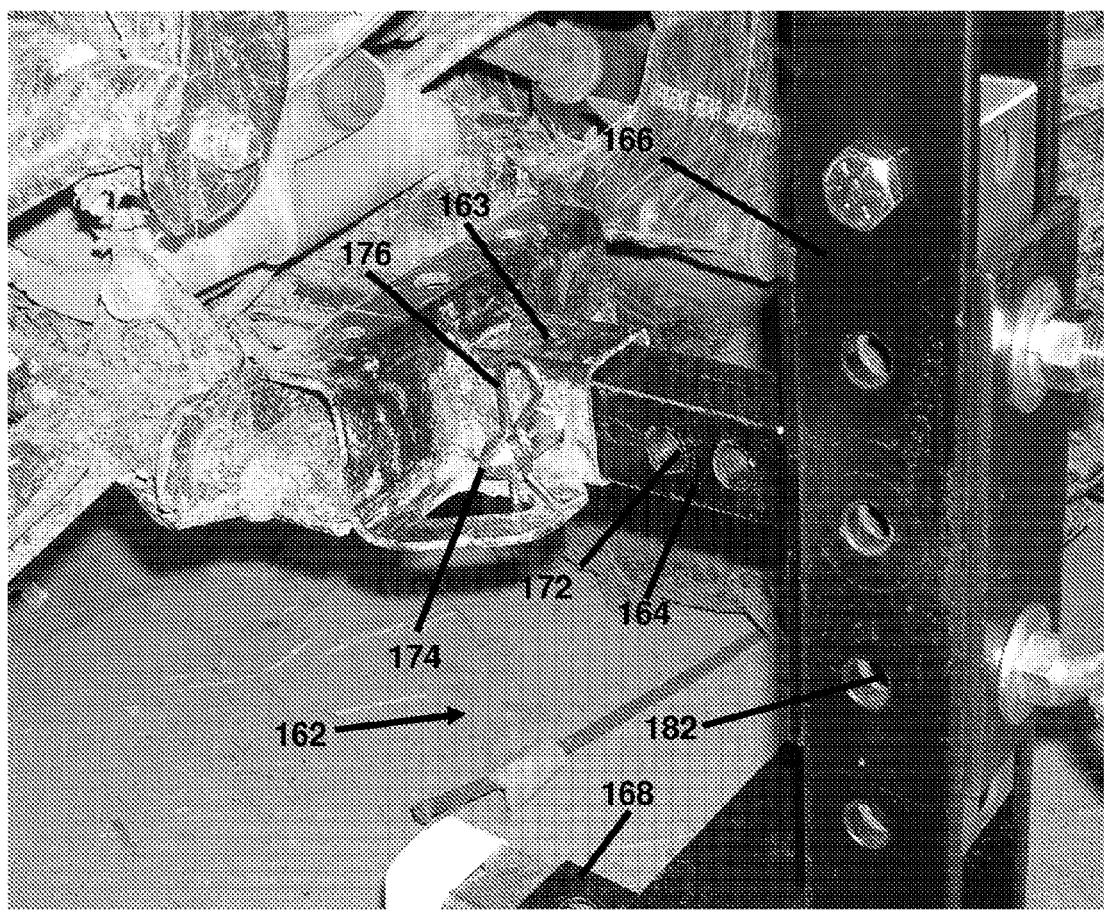
FIG. 17 shows a receiver hitch of a connector assembly of a hay bale suspension system non-pivotally connected to a receiver hitch of a vehicle according to another embodiment of the present invention.

Another embodiment of a connector assembly 162 of a hay bale suspension system is illustrated in FIGS. 15-17. This hay bale suspension system is operable for non-pivotal connection to a receiver hitch 163 of a vehicle and comprises the connector assembly 162 and a hay bale support assembly. The connector assembly comprises a receiver hitch 164, a vertical post 166, a connector shaft 168, and a hitch bar 170. This embodiment need not comprise or utilize the support shaft described above by virtue of the non-pivotal connection to a receiver hitch of a vehicle, rather than to a ball or a bottom plate of a ball hitch that, independent of the support shaft, may not sufficiently prevent pivoting of a hay bale suspension system.

The receiver hitch 164 non-pivotally secures at one end to a complementary receiver hitch 163 of the vehicle and is perpendicularly and non-pivotally secured at another end to the vertical post 166. One of the receiver hitch 164 and the complementary receiver hitch 163 inserts into the other of the receiver hitch 164 and the complementary receiver hitch 163 such that the receiver hitch 164 does not pivot relative to the complementary receiver hitch when secured thereto. Generally, as shown in FIGS. 16 and 17, the receiver hitch 164 of the connector assembly 162 comprises a male receiver hitch 164 and the complementary receiver hitch 163 of the vehicle comprises a female receiver hitch 163 into which the male receiver hitch inserts and non-pivotally secures. Further, as shown in FIGS. 15 and 17, the male receiver hitch 164 may comprise an aperture 172 that aligns with an aperture in the female receiver hitch 163 of the vehicle with insertion of the male receiver hitch 164 therein. A locking pin 174 may pass through the aligned apertures to secure the male receiver hitch 164 to the female receiver hitch 163. The locking pin 174, for example, may comprise an aperture for passage of a cotter pin 176, or other quick release pin, to prevent withdrawal of the locking pin 174 from the aligned apertures without prior removal of the cotter pin 176. Other locking devices are contemplated in addition to or in the alternative of the locking pin 174 to secure the male and female receiver hitches. Further, it is contemplated that the receiver hitch 164 of the connector assembly 162 may comprise a female receiver hitch, while the complementary receiver hitch of the vehicle may comprise a male receiver hitch.

The vertical post 166 is secured at a lower end to the connector shaft 162. As shown in FIGS. 15 and 16, a bracket 178 and nuts/bolts, or other suitable, tighten-able fasteners, may be used to rigidly secure the vertical post 166 to the connector shaft 168 such the vertical post 166 is not pivotable relative to the connector shaft 168. At least one of the pulley 180, the receiver hitch 164, and the connector shaft 168 may be variably positionable along the length of the vertical post 166 by securing to any one or more of the apertures 182 therein. The hitch bar 170 is perpendicularly and non-pivotally secured to the connector shaft 168. The connecting arms of the hay bale support assembly connect the hay support system and the pins of the hitch bar 170 such that the hay support system is non-pivotally secured to the vehicle via the connector assembly 162. The hay bale suspension system may be disconnected and removed from the vehicle simply by removing the locking pin, or other fastener, securing the complementary receiver hitches and removing the receiver hitch 164 of the connector assembly 162 from the receiver hitch of the vehicle.

It is contemplated by the present invention that the vehicle to which an embodiment of the hay bale suspension system may be applied need not necessarily be an all-terrain vehicle. Rather, the vehicle may be a tractor, truck, automobile, or any other similarly functioning device having a hitching device, whether a ball hitch or a receiver hitch, extending from the vehicle. Use of embodiments of the present invention with such alternative vehicles, however, may result in substantially more hitch weight and be more dependent on the countervailing weight of such vehicle. It is further contemplated by the present invention that equipment that may be secured to a vehicle 1 through the hitching apparatus and/or the connector assembly of the present invention is not limited to the hay bale suspension system. Rather, equipment, such as, but not limited to, a rack, may be non-pivotally connected by the hitching apparatus or the connector assembly to a vehicle.

It is noted that terms like "generally," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components.

It is noted that recitations herein of a component of the present invention being "configured" in a particular way or to embody a particular property, or function in a particular manner, are structural recitations as opposed to recitations of intended use. More specifically, the references herein to the manner in which a component is "configured" denotes an existing physical condition of the component and, as such, is to be taken as a definite recitation of the structural characteristics of the component.

For the purposes of describing and defining the present invention it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The foregoing description of the invention has been presented for purposes of illustration and description. It is not intended to be exhaustive or to limit the invention to the precise form disclosed, and other modifications and variations may be possible in light of the above teachings. The above embodiments disclosed were chosen and described to explain the principles of the invention and its practical application to thereby enable others skilled in the art to best utilize the invention. It is intended that the appended claims be construed to include other alternative embodiments of the invention except insofar as limited by the prior art. Therefore, having described the invention in detail and by reference to specific embodiments thereof, it will be apparent that modifications and variations are possible without departing from the scope of the invention defined in the appended claims.

What is claimed is:

1. A hay bale suspension system for non-pivotal connection to a vehicle, the hay bale suspension system comprising a connector assembly and a hay bale support assembly, wherein:
the connector assembly comprises a receiver hitch, a vertical post, a connector shaft, and a hitch bar;
the receiver hitch non-pivotally secures at one end to a complementary receiver hitch of the vehicle and is non-pivotally secured at another end to the vertical post;
one of the receiver hitch and the complementary receiver hitch inserts into the other of the receiver hitch and the complementary receiver hitch so that the receiver hitch does not pivot relative to the complementary receiver hitch when secured thereto;
the vertical post is non-pivotally secured at a lower end to the connector shaft;
the hitch bar is perpendicularly and non-pivotally secured to the connector shaft and comprises two pins extending from two ends of the hitch bar;
the hay bale support assembly comprises a hay support system, a pulley system, and two connecting arms;
the pulley system comprises a plurality of pulleys, a winch, and a cable;
one of the pulleys is secured to an upper end of the vertical post of the connector assembly and another of the pulleys is secured to the hay support system; and
the connecting arms connect the hay support system and the pins of the hitch bar such that the hay support system is non-pivotally secured to the vehicle via the connector assembly.

2. The hay bale suspension system of claim 1, wherein the receiver hitch of the connector assembly comprises a male receiver hitch and the complementary receiver hitch of the vehicle comprises a female receiver hitch into which the male receiver hitch inserts and non-pivotally secures.

3. The hay bale suspension system of claim 2, wherein the male receiver hitch comprises an aperture that aligns with an aperture in the female receiver hitch and a locking pin that passes through the aligned apertures to secure the male receiver hitch to the female receiver hitch.

4. The hay bale suspension system of claim 1, wherein the vertical post comprises a plurality of apertures and at least one of the pulley, the receiver hitch, and the connector shaft are variably positionable by securing to any one or more of the apertures.

5. The hay bale suspension system of claim 1, wherein the hay support system comprises a base support, a vertical support, an axle, two wheels, and at least one of a spike and one or more forks, wherein the base support supports the vertical support above a ground surface, the spike, if provided, extends perpendicularly from the vertical support, the forks, if provided, extend perpendicularly from the base support, the axle is coupled to the base support, and the wheels are secured to ends of the axle such that the axle and the wheels provide a stable suspension for the hay bale suspension system.

6. The hay bale suspension system of claim 5, wherein with the winding of the cable by the winch, the pulley system tilts the hay support system, and a hay bale supported thereon, such that the hay bale is aligned over the base support, the axle, and the wheels such that a substantial weight of the hay bale is borne by the base support, the axle, and the wheels, rather than the pulley system or the vehicle.

7. The hay bale suspension system of claim 1, wherein the hay bale suspension system further comprises an electrical connection that connects the winch and a battery of the vehicle and a power switch that controls electrical output from the battery to the winch through the electrical connection.

8. The hay bale suspension system of claim 1, wherein each of the connecting arms comprises two or more partially overlapping bars that allow respective lengths of the connecting arms to adjust.

9. The hay bale suspension system of claim 1, wherein the hay bale suspension system further comprises at least one restrictive arm coupled at its terminal ends to the connecting arms so as to maintain a spaced relationship between the connecting arms.

10. A hay bale suspension system for non-pivotal connection to a vehicle, the hay bale suspension system comprising a connector assembly and a hay bale support assembly, wherein:
the connector assembly comprises a male receiver hitch, a vertical post, a connector shaft, and a hitch bar;
the male receiver hitch inserts into and non-pivotally secures at one end to a female receiver hitch of the vehicle and is non-pivotally secured at another end to the vertical post;
the male receiver hitch comprises an aperture that aligns with an aperture in the female receiver hitch and a locking pin that passes through the aligned apertures to secure the male receiver hitch to the female receiver hitch;
the vertical post is non-pivotally secured at a lower end to the connector shaft and comprises a plurality of apertures along a length thereof;
the hitch bar is perpendicularly and non-pivotally secured to the connector shaft and comprises two pins extending from two ends of the hitch bar;
the hay bale support assembly comprises a hay support system, a pulley system, and two connecting arms;
the pulley system comprises a plurality of pulleys, a winch, and a cable;
one of the pulleys is secured to an upper end of the vertical post of the connector assembly and another of the pulleys is secured to the hay bale support; and
the connecting arms connect the base support of the hay support system and the pins of the hitch bar such that the hay support system is non-pivotally secured to the vehicle via the connector assembly.

* * * * *